G. B. HOUSTON & J. A. HELMAN.
BONNET FOR MOTOR CARS.
APPLICATION FILED MAR. 23, 1914.
1,299,944.
Patented Apr. 8, 1919.
3 SHEETS—SHEET 3.
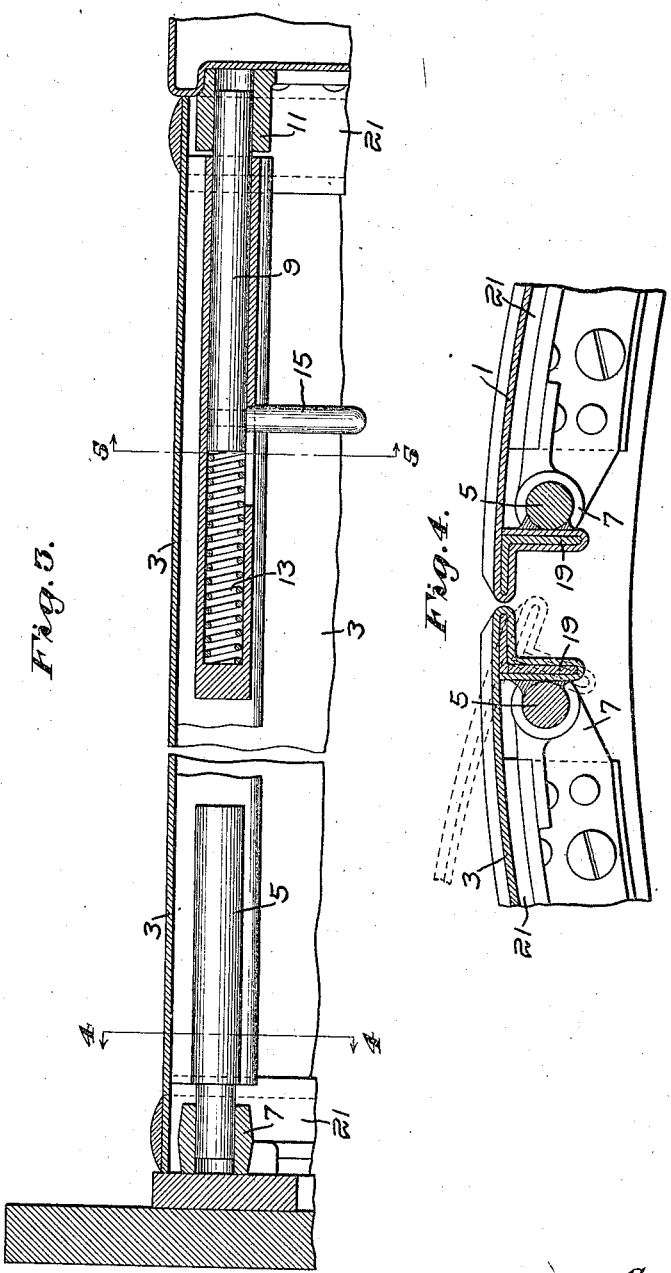
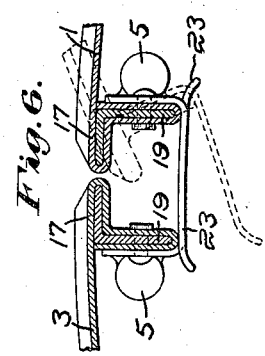
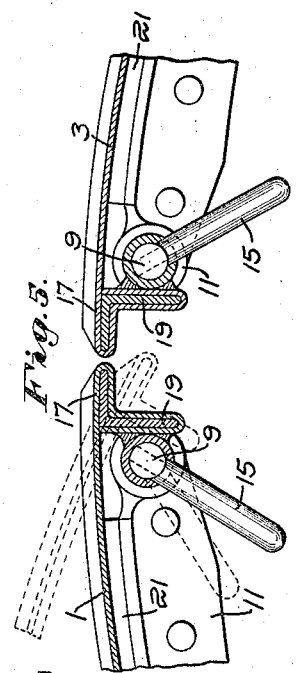
Witnesses:
Carl L. Choate.
Horace A. Crosman.
Inventors:
George B. Houston,
John A. Helman,
by Emery, Booth, Janney & Varney
Att'ys.

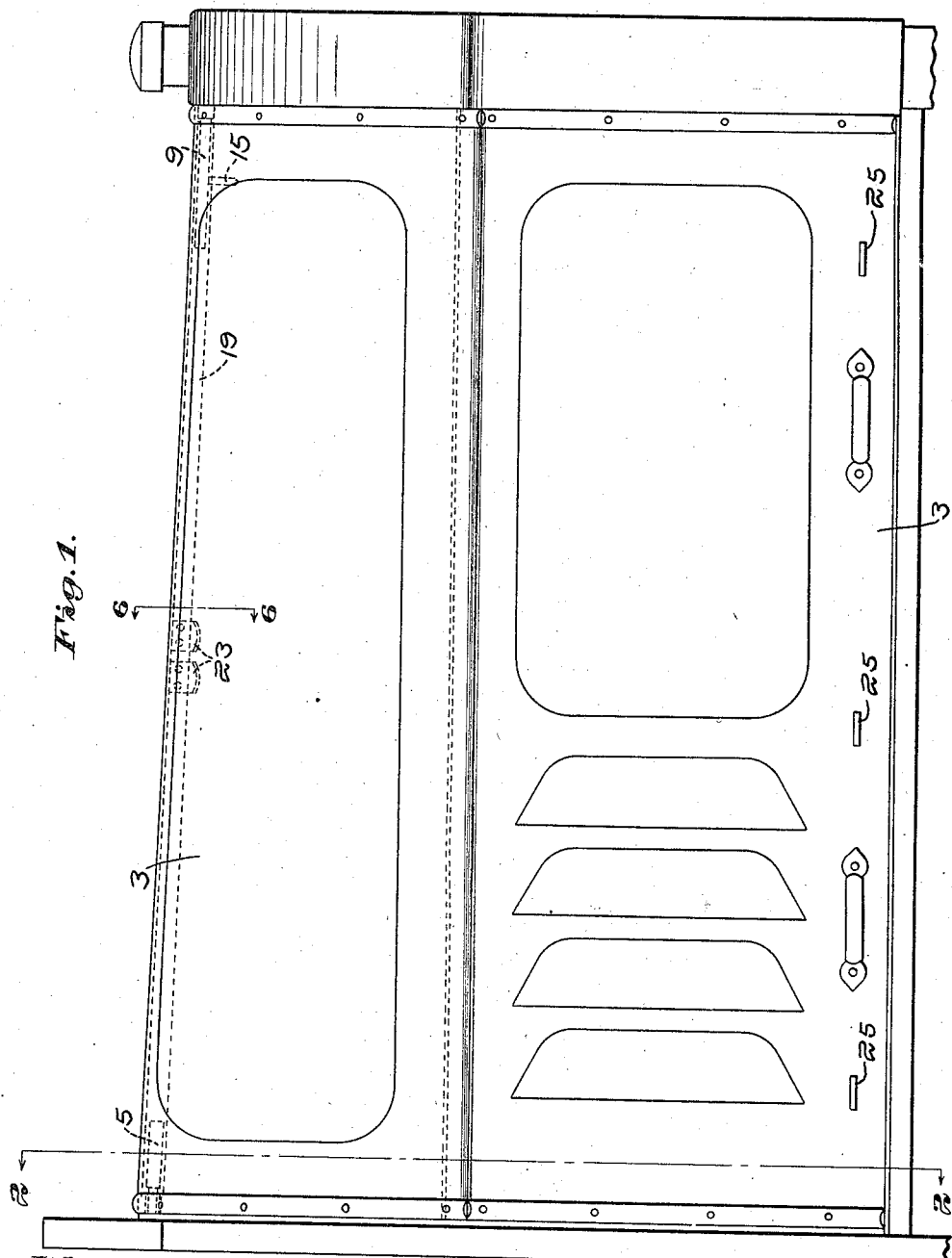

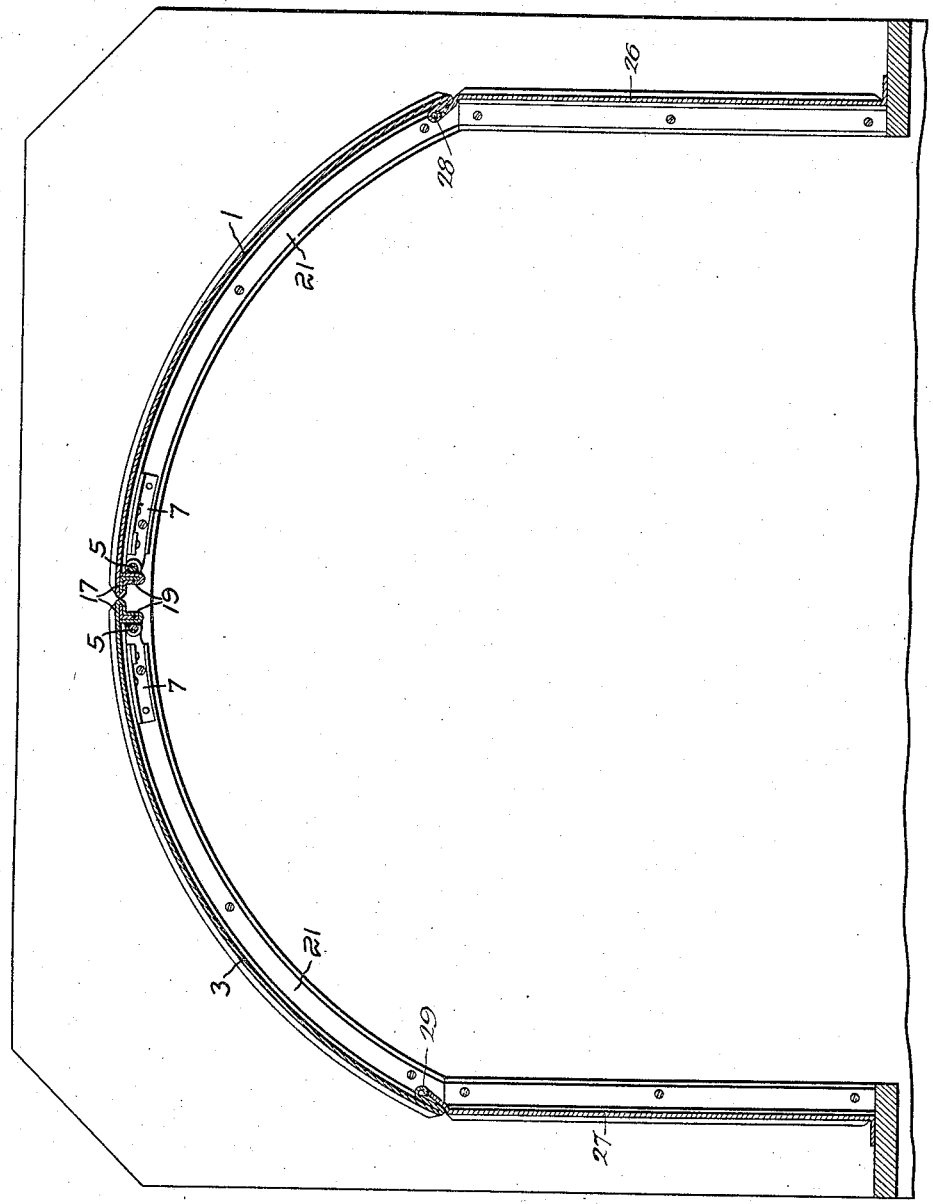

UNITED STATES PATENT OFFICE.

GEORGE B. HOUSTON AND JOHN A. HELMAN, OF BRIDGEPORT, CONNECTICUT, ASSIGNORS TO THE LOCOMOBILE COMPANY OF AMERICA, OF NEW YORK, N. Y., A CORPORATION OF WEST VIRGINIA.

BONNET FOR MOTOR-CARS.

1,299,944.  Specification of Letters Patent.  Patented Apr. 8, 1919.

Application filed March 23, 1914. Serial No. 826,526.

*To all whom it may concern:*

Be it known that we, GEORGE B. HOUSTON and JOHN A. HELMAN, citizens of the United States, and residents of Bridgeport, Connecticut, have invented an Improvement in Bonnets for Motor-Cars, of which the following description, in connection with the accompanying drawings, is a specification, like characters on the drawings representing like parts.

This invention relates to an improved bonnet for motor cars.

The character of the invention may be best understood by reference to the following description of an illustrative embodiment thereof shown in the accompanying drawing, wherein:

Figure 1 is a side elevation of an illustrative bonnet shown herein as embodying the invention;

Fig. 2 is a section taken on line 2—2 of Fig. 1;

Fig. 3 on an enlarged scale is a sectional detail showing the hinge pintles for a section of the bonnet;

Fig. 4 is a section taken on line 4—4 of Fig. 3;

Fig. 5 is a section taken on line 5—5 of Fig. 3; and

Fig. 6 on an enlarged scale is a section taken on line 6—6 of Fig. 1.

Referring to the drawing, the illustrative bonnet there shown as embodying the invention comprises two separate sections 1 and 3 each of a length sufficient to extend from the cowl to the radiator.

To permit the sections to swing open and give access to the engine each is provided with hinge means adjacent the meeting edges of the sections comprising a pintle 5 fast on the end of the section adjacent a suitable rear support, herein the cowl, and adapted to be set in a socket in a bracket 7 attached to said cowl and an adjustable pintle 9 mounted on the opposite end of the section and adapted to enter a socket in a bracket 11 on a suitable front support, herein the radiator. The adjustable pintle is provided with a spring 13 which tends to maintain the same in its socket and with a handle 15 for withdrawing the pintle therefrom in removing the section, as more fully hereinafter described. The hinge pintles are not located exactly at the meeting edges of the sections but are offset therefrom (Fig. 4). The purpose of this is to provide margins 17, 17 beyond said pintles which may rock up toward one another and provide a complete closure and also permit the ready rocking of the sections into open position. By this construction when the sections are closed there is no ridge extending along the top of the bonnet presenting an unsightly projection such as heretofore has been produced by the hinge of the unitary bonnet hitherto used. On the contrary the surfaces of the portions of the sections adjacent their meeting edges are uninterrupted and flush with one another, presenting a simple, neat and smooth appearance.

To strengthen the bonnet each section may be provided with a rib 19 extending longitudinally thereof and conveniently of angle iron form with one flange flat on the under face of the section at its upper edge and the other flange depending from said face a short distance from said edge. The sheet forming a section may be wrapped about and shaped to conform to the contour of the angle iron as shown in Fig. 4, thereby providing a neat, strong construction. The hinge pintles 5 referred to may be welded or otherwise secured to the depending flange of the angle iron.

The dash and radiator may be each provided with angle iron guides 21 against which the bonnet sections may seat when in closed position. As shown herein the pintle receiving sockets are mounted fast on said angle iron guides, thereby providing a good strong construction.

The angle iron strengthening ribs are advantageous in preventing sagging or vibration of the sections adjacent their meeting edges. To further contribute to the holding of the sections in proper relation each may be provided with a tongue 23 (Fig. 6) having one end fixed to the angle iron rib thereof and the other end projecting across the depending flange of the angle iron rib of the other. These tongues are of resilient material and are curved somewhat so that when the sections are rocked down to close the same the tongues will wipe along said flanges and be flexed and energized in such a manner as to provide mutual support for the sections. Preferably these tongues are located midway between the ends of the sections where the tendency for relative movement between them is greatest.

The lower edge of each section may be provided with usual latches 25 for locking the same in closed position.

The sections 1 and 3 are hinged to sections 26 and 27 respectively by usual hinges 28 and 29 which are located on the inner side of the hood or bonnet and permit the sections 26 and 27 to fold inwardly with respect to the sections 1 and 3. It will be remembered that the hinges at the top of the hood are within the latter and since the hinges at the sides are also within the hood the latter presents a neat, sightly appearance and leakage of water into the hood is greatly reduced or altogether eliminated.

If it is desired to have access to one side of the engine the latches of said sections are unlocked and the section is swung upwardly about its hinge pintles as a fulcrum. To support the section in this position its lower edge may rest in a notch (not shown) appropriately located on the radiator or if desired the section may be swung upward and folded so that its parts lie back slightly over the other section with its rocking movement limited by the engagement of the depending angle iron flange with the stops on the pintle socket brackets.

If it is desired to remove a section from the car the spring pressed pintle is withdrawn from its socket and then the section may be tilted slightly sidewise and then drawn longitudinally so that the fixed pintle may be withdrawn from its socket and the section lifted from the car. A single section is so light that this may be readily done by one person unassisted, without any danger of scratching or marring the car.

In case it is desired to remove the entire bonnet from the car the other section is lifted off in a manner similar to that just described. The sections may be replaced on the car with equal facility.

Having described one illustrative embodiment of the invention without limiting the same thereto, what we claim as new and desire to secure by Letters Patent is:

1. A bonnet for a motor car comprising a plurality of sections, and means for detachably connecting them with the car in position to form a closed bonnet and each being removable independently of the connection of the other.

2. A bonnet for a motor car comprising a plurality of separate sections, and hinge means for connecting each of said sections to the car independently of the other, the sections so connected forming a closed bonnet.

3. A bonnet for a motor car comprising separate sections having opposed edges, and hinge means adjacent said edges for connecting said sections to the car.

4. A bonnet for a motor car comprising separate sections, and hinge means for connecting the same with the car and adapted to permit the opening of one of said sections without interference with or movement of the other.

5. A bonnet for a motor car comprising separate sections, and hinge means for connecting each of said sections to the car in position to form a closed bonnet and adapted to permit said sections to present adjacent surface portions flush with one another.

6. A bonnet for a motor car comprising separate sections, and hinge means therefor including pintles adapted to seat in sockets on the dash and radiator of the car.

7. A bonnet for a motor car comprising separate sections, and hinge pintles for each section adapted to seat in sockets on the dash and radiator of the car, one of said pintles being fixed on its section and another of said pintles being adjustable on its section.

8. A bonnet for a motor car comprising separate sections for covering the space between the dash and radiator of the car, hinge means adjacent the upper edges of said sections for detachably connecting the same with said dash and radiator, and latch means for securing the lower edges of said sections to the car.

9. A bonnet for a motor car comprising separate sections having opposed edges, strengthening ribs extending along said sections adjacent said edges, and means including hinge means and latch means for detachably connecting each section to the car independently of the other.

10. A bonnet for a motor car comprising separate sections having opposed upper edges, means detachably connecting each section to the car independently of the other in such position that the sections collectively form a closed bonnet, and means for preventing vibration of said edges relatively to one another.

11. A bonnet for a motor car comprising separate sections having opposed edges and means for preventing vibration of said edges relatively to one another including a member on each section for engagement with the other.

12. A bonnet for a motor car comprising separate sections having opposed edges, and means for preventing vibration of said edges relatively to one another including a tongue on each section for engagement with the other.

13. A bonnet for a motor car comprising separate sections having opposed edges, strengthening ribs on said sections adjacent said edges, and a tongue on each section for engagement with the rib of the other.

14. A bonnet for a motor car comprising separate sections, hinge means for connecting each section to the car independently of the other, and a member on each section for yieldingly pressing against the other to contribute to the maintenance of their adjacent portions in flush relation.

15. An automobile hood comprising two top sections, each mounted to swing outwardly and hinge means for said sections providing portions mounted on stationary portions of the car, said hinge means being located on the inner side of the hood.

16. An automobile hood comprising a top section hingedly mounted to swing outwardly, and having the hinging means located under the hood.

17. An automobile hood comprising two sections having opposed edges and hingedly mounted to swing outwardly one relative to the other and hinging means for said sections located inwardly of the sections.

18. An automobile hood, comprising two top sections, each folding outwardly, and separate hinges, one for each of said top members, disposed on the inner side of the hood.

19. An automobile hood, comprising two top sections, each folding outwardly, and separate substantially parallel hinges, one for each of said top members, disposed on the inner side of the hood.

20. An automobile hood, comprising two top sections, each folding outwardly, and separate hinges, one for each of said top members, disposed on the inner side of the hood, and side members pivotally connected to each of said top members, and swinging inwardly on hinges located on the inner side of said hood.

21. An automobile hood, comprising a plurality of parts folding outwardly, each of said parts having independent pintles, each of said pintles having its own bearing on the dash and radiator of the car.

22. An automobile hood, comprising a plurality of parts folding outwardly, each of said parts having independent pintles, each of said pintles having its own bearing on stationary parts of the car.

23. An automobile hood, comprising in combination two parts having separate pintles, and each providing an outwardly swinging portion and an inward projection extending toward the opposite side inwardly from the pintles.

24. An automobile hood comprising complementary hinged top sections having a flush meeting joint on the upper surface thereof.

25. An automobile hood, comprising a frame and complementary top sections independently hinged to said frame, and having a flush meeting joint on the top surface thereof.

26. An automobile hood, comprising a frame, and complementary top sections independently hinged to and removable from said frame.

27. An automobile hood, comprising a frame, and complementary top sections having a central joint flush with the upper surface thereof, each of said sections being independently hinged to and removable from said frame.

28. An automobile hood, comprising a frame, complementary top sections separate from each other and having a meeting joint flush with the upper surface, side sections hinged to said top sections, and independent pivotal connections between said top sections and said frame arranged below the top surface.

29. An automobile hood, comprising a frame, and complementary top sections separately engaged with said frame, and independently removable therefrom.

30. An automobile hood, comprising a frame and top sections, independently pivotally engaging said frame, the two pivotal axes being parallel.

31. An automobile hood, comprising in combination two outwardly swinging hinged portions, two independent substantially parallel pintles, one for each of said hinged portions, each of said hinged portions providing an inward projection toward the other hinged portion, said projections folding inwardly entirely independently of each other when said hinged portions of said hood are swung outwardly.

32. A housing of the class described comprising, in combination, two outwardly-folding top-sections, and hinge means therefor including an axially slidable bolt within said housing, and a socket receiving said bolt.

33. An automobile hood comprising, in combination, a frame, a pair of top-sections, pintles disposed within said hood and connecting said top-sections at one end to said frame, and slidable bolts connecting said top-sections at the other end to said frame.

34. A bonnet for a motor car comprising a plurality of hinged sections having all of their hinges within said hood, one of said hinges comprising an axially slidable bolt, and a socket therefor.

35. An automobile hood comprising a top-section hingedly mounted to swing outwardly and hinging means disposed beneath the hood, said hinging means including an axially slidable bolt and a socket therefor.

In testimony whereof, we have signed our names to this specification, in the presence of two subscribing witnesses.

GEORGE B. HOUSTON.
JOHN A. HELMAN.

Witnesses:
EDW. W. BERGIN,
H. H. EDGE.

Copies of this patent may be obtained for five cents each, by addressing the "Commissioner of Patents, Washington, D. C."